United States Patent
Kong

(10) Patent No.: US 8,577,133 B2
(45) Date of Patent: Nov. 5, 2013

(54) METHOD AND WIRELESS HANDHELD DEVICE FOR DETERMINING IMAGE HUE

(71) Applicant: Huawei Device Co., Ltd., Shenzhen (CN)

(72) Inventor: Jianyoung Kong, Shanghai (CN)

(73) Assignee: Huawei Device Co., Ltd, Shenzhen (CN)

( * ) Notice: Subject to any disclaimer, the term of this patent is extended or adjusted under 35 U.S.C. 154(b) by 0 days.

(21) Appl. No.: 13/720,011

(22) Filed: Dec. 19, 2012

(65) Prior Publication Data

US 2013/0208981 A1  Aug. 15, 2013

(30) Foreign Application Priority Data

Feb. 10, 2012  (CN) .......................... 2012 1 0030189

(51) Int. Cl.
 *G06K 9/00*  (2006.01)
(52) U.S. Cl.
 USPC .......................................... 382/162; 382/165
(58) Field of Classification Search
 USPC ................... 382/162, 165, 166, 167; 358/520
 See application file for complete search history.

(56) References Cited

U.S. PATENT DOCUMENTS

| | | | |
|---|---|---|---|
| 6,519,360 B1 * | 2/2003 | Tanaka ........................... | 382/162 |
| 6,901,163 B1 * | 5/2005 | Pearce et al. ................... | 382/165 |
| 2002/0090133 A1 * | 7/2002 | Kim et al. ...................... | 382/164 |
| 2006/0061842 A1 | 3/2006 | Oka et al. | |
| 2007/0126933 A1 | 6/2007 | Ting | |
| 2008/0165290 A1 | 7/2008 | Li et al. | |
| 2008/0186518 A1 | 8/2008 | Shoda | |
| 2010/0054584 A1 | 3/2010 | Schadt et al. | |
| 2010/0254597 A1 | 10/2010 | Yen et al. | |
| 2011/0019029 A1 | 1/2011 | Matsumoto et al. | |
| 2011/0158519 A1 * | 6/2011 | Zhao ............................ | 382/165 |
| 2012/0288192 A1 * | 11/2012 | Heidrich et al. .............. | 382/167 |

FOREIGN PATENT DOCUMENTS

| | | |
|---|---|---|
| CN | 1976480 A | 6/2007 |
| CN | 101043578 A | 9/2007 |
| CN | 101231757 A | 7/2008 |

(Continued)

OTHER PUBLICATIONS

Extended European Search Report in corresponding European Patent Application No. 12198308.4 (Feb. 28, 2013).

(Continued)

*Primary Examiner* — Phuoc Tran
(74) *Attorney, Agent, or Firm* — Huawei Device Co., Ltd

(57) ABSTRACT

The present invention provides a method and a wireless handheld device for determining image hue, which relate to the field of image processing. The method includes: obtaining color information of a part or all of pixels of an image including hue values, brightness values and saturation values; determining a pixel whose hue value needs to be compared according to the obtained color information, and comparing the pixel, whose hue value needs to be compared, with hue values of preset multiple candidate colors, determining a closest candidate color, and accumulating a weight value of the pixel whose hue value needs to be compared to a weight value of the closest candidate color; and using hue of a candidate color with the highest weight value as hue of the image. The device includes: a color obtaining module, a pixel determination module, a weight value accumulation module and a hue determination module.

14 Claims, 4 Drawing Sheets

(56) References Cited

FOREIGN PATENT DOCUMENTS

| | | |
|---|---|---|
| CN | 101459855 A | 6/2009 |
| CN | 101964874 A | 2/2011 |
| CN | 102694958 A | 9/2012 |
| EP | 2244209 A2 | 10/2010 |
| JP | 1998-210308 A | 8/1998 |

OTHER PUBLICATIONS

Search Report in corresponding Chinese Patent Application No. 201210030189.X (Apr. 11, 2013).

International Search Report in corresponding International Patent Application No. PCT/CN2012/087319 (Apr. 4, 2013).

* cited by examiner

METHOD AND WIRELESS HANDHELD DEVICE FOR DETERMINING IMAGE HUE

CROSS-REFERENCE TO RELATED APPLICATION

This application claims priority to Chinese Patent Application No. 201210030189.X, filed on Feb. 10, 2012, which is hereby incorporated by reference in its entirety.

FIELD OF THE INVENTION

The present invention relates to the field of image processing, and in particular, to a method and a wireless handheld device for determining image hue.

BACKGROUND OF THE INVENTION

Hue refers to a qualitative appearance that can be assumed by a color, is the primary feature of the color and is the most accurate standard to distinguish different colors. Determination of image hue is an operation widely applied in the field of image processing. After the image hue is determined, suitable elements, such as a background and a frame can be added to an image. For example, the color of a light spot background in the background is painted according to a hue value of an image in the foreground, thereby increasing visual uniformity and integrity of the image.

At present, the process of determining image hue is simple. A method of weighted averaging is usually adopted, and the process thereof specifically includes: adding RGB (red, green, blue) values of colors of all pixels in the image and calculating an average value, so as to obtain hue of the image; or, adding hue values of all pixels in the image and calculating an average value, so as to obtain hue of the image.

The image hue calculated by the method of weighted averaging is inaccurate. For example, for an image that is half pure red and half pure green, the calculated average value is pure yellow, so the image hue is distorted.

SUMMARY OF THE INVENTION

To solve the problem that calculated image hue is distorted, embodiments of the present invention provide a method and a wireless handheld device for determining image hue. Technical solutions are as follows.

A method for determining image hue includes:

obtaining color information of a part or all of pixels of an image, in which the color information includes hue values, brightness values and saturation values;

determining a pixel whose hue value needs to be compared, according to the obtained brightness values and saturation values of the part or all of the pixels;

comparing the hue value of the pixel whose hue value needs to be compared with hue values of preset multiple candidate colors, determining a candidate color closest to the hue value of the pixel whose hue value needs to be compared, and accumulating a weight value of the pixel whose hue value needs to be compared to a weight value of the closest candidate color, in which the hue values of the multiple candidate colors are evenly covered on a hue circle; and using hue of a candidate color with the highest weight value as hue of the image.

A wireless handheld device for determining image hue includes:

a color obtaining module, configured to obtain color information of a part or all of pixels of an image, in which the color information includes hue values, brightness values and saturation values;

a pixel determination module, configured to determine a pixel whose hue value needs to be compared, according to the obtained brightness values and saturation values of the part or all of the pixels;

a weight value accumulation module, configured to compare the hue value of the pixel whose hue value needs to be compared with hue values of preset multiple candidate colors, determine a candidate color closest to the hue value of the pixel whose hue value needs to be compared, and accumulate a weight value of the pixel whose hue value needs to be compared to a weight value of the closest candidate color, in which the hue values of the multiple candidate colors are evenly covered on a hue circle; and a hue determination module, configured to use hue of a candidate color with the highest weight value as hue of the image.

A wireless handheld device for determining image hue, comprising a processor configured to:

obtain color information of a part or all of pixels of an image, wherein the color information comprises hue values, brightness values and saturation values;

determine a pixel whose hue value needs to be compared, according to the obtained brightness values and saturation values of the part or all of the pixels;

compare the hue value of the pixel whose hue value needs to be compared with hue values of preset multiple candidate colors, determine a candidate color closest to the hue value of the pixel whose hue value needs to be compared, and accumulate a weight value of the pixel whose hue value needs to be compared to a weight value of the closest candidate color, wherein the hue values of the multiple candidate colors are evenly covered on a hue circle; and use hue of a candidate color with the highest weight value as hue of the image.

The benefit of the technical solutions provided in the embodiments of the present invention is as follows.

Color information of a part or all of pixels of an image is obtained, a pixel whose hue value needs to be compared is determined according to obtained brightness values and saturation values of the part or all of the pixels, the hue value of the pixel whose hue value needs to be compared is compared with hue values of preset multiple candidate colors with hue values evenly covered on a hue circle, a closest candidate color is determined, a weight value of the pixel whose hue value needs to be compared is accumulated to a weight value of the closest candidate color, and the hue of a candidate color with the highest weight value is used as the hue of the image. Therefore, the overall hue value of the image is calculated rapidly and accurately, and the visual feeling of human eyes is truly reflected.

BRIEF DESCRIPTION OF THE DRAWINGS

To illustrate the technical solutions in the embodiments of the present invention more clearly, the accompanying drawings for illustrating the embodiments are briefly described below. Apparently, the accompanying drawings in the following description illustrate only some embodiments of the present invention, and persons of ordinary skill in the art can derive other accompanying drawings from the accompanying drawings without creative efforts.

DETAILED DESCRIPTION OF THE EMBODIMENTS

To make the objectives, technical solutions and advantages of the present invention clearer, the embodiments of the present invention are described in further detail below with reference to the accompanying drawings.

First, terms in the image field involved in the present invention are introduced.

Hue refers to a qualitative appearance that can be assumed by a color, is the primary feature of the color and is the most accurate standard to distinguish different colors.

Saturation refers to the intensity or vividness of a color. For example, pink is a not very saturated red color, while ripe apple red is a very saturated red color.

Brightness refers to the light and shade degree of a color. For example, pink is a bright red color, while brown red is a very dark red color. RGB refers to red, green and blue, which is an expression form of a color.

HSV (Hue Saturation Brightness) refers to hue, saturation and brightness, which is also an expression form of a color.

The RGB format and the HSV format are interchangeable.

A hue circle is a closed circle representing hue, for example, a six-hue circle composed of red, orange, yellow, green, blue and purple, a ten-hue circle composed of red, orange, yellow, yellow green, green, cyan green, blue, blue purple, purple and purple red, and a twelve-hue circle composed of red, red orange, yellow orange, yellow, yellow green, green, green blue, blue green, blue, blue purple, purple and red purple.

A hue value represents a position of a color on a hue circle.

It should be noted that a wireless handheld device involved in embodiments of the present invention includes, but is not limited to, a user equipment (UE, User Equipment), a mobile station (MS, Mobile Station), a mobile terminal (Mobile Terminal), a mobile telephone (Mobile Telephone), a handset (handset) and a portable equipment (portable equipment), such as a tablet computer, a digital photo frame, a netbook, a music playing equipment with a screen, a video player, and a game player.

Embodiment 1

Figure 1:
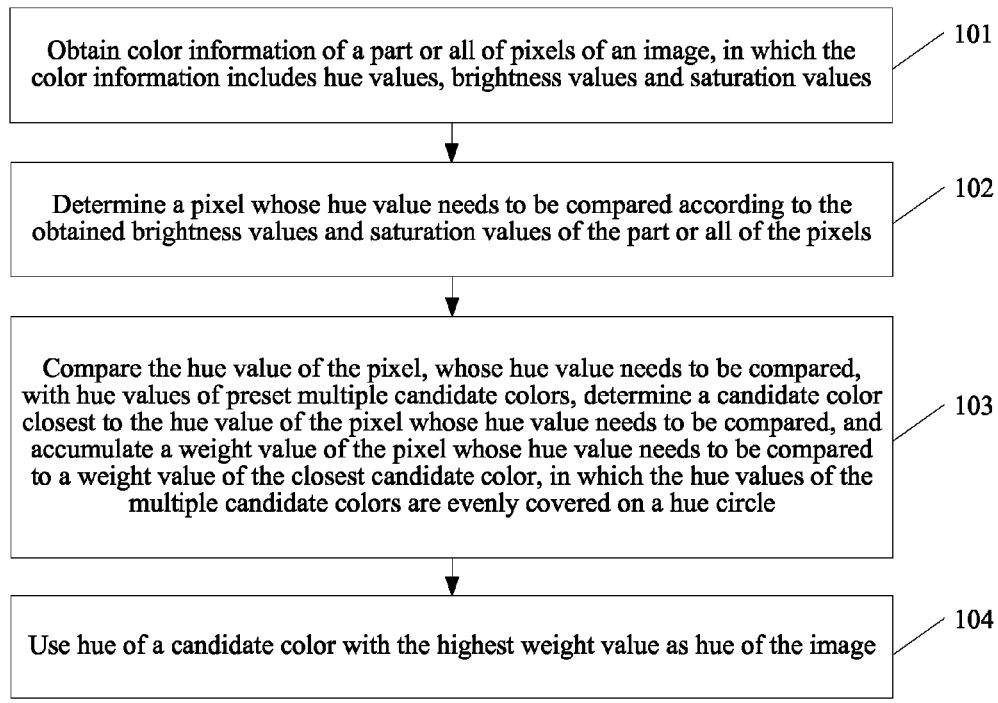
FIG. 1 is a flow chart of a method for determining image hue according to Embodiment 1 of the present invention.

Referring to FIG. 1, this embodiment provides a method for determining image hue. The method includes the following steps.

101: Obtain color information of a part or all of pixels of an image, in which the color information includes hue values, brightness values and saturation values.

102: Determine a pixel whose hue value needs to be compared according to the obtained brightness values and saturation values of the part or all of the pixels.

103: Compare the hue value of the pixel, whose hue value needs to be compared, with hue values of preset multiple candidate colors, determine a candidate color closest to the hue value of the pixel whose hue value needs to be compared, and accumulate a weight value of the pixel whose hue value needs to be compared to a weight value of the closest candidate color, in which the hue values of the multiple candidate colors are evenly covered on a hue circle.

104: Use hue of a candidate color with the highest weight value as hue of the image.

It should be noted that an execution subject of steps 101 to 103 is a wireless handheld device.

In this embodiment, color information of a part or all of pixels of an image is obtained, a pixel whose hue value needs to be compared is determined according to obtained brightness values and saturation values of the part or all of the pixels, the hue value of the pixel whose hue value needs to be compared is compared with hue values of preset multiple candidate colors with hue values evenly covered on a hue circle, a closest candidate color is determined, a weight value of the pixel whose hue value needs to be compared is accumulated to a weight value of the closest candidate color, and the hue of a candidate color with the highest weight value is used as the hue of the image. Therefore, the overall hue value of the image is calculated rapidly and accurately, and the visual feeling of human eyes is truly reflected.

Embodiment 2

Figure 2:
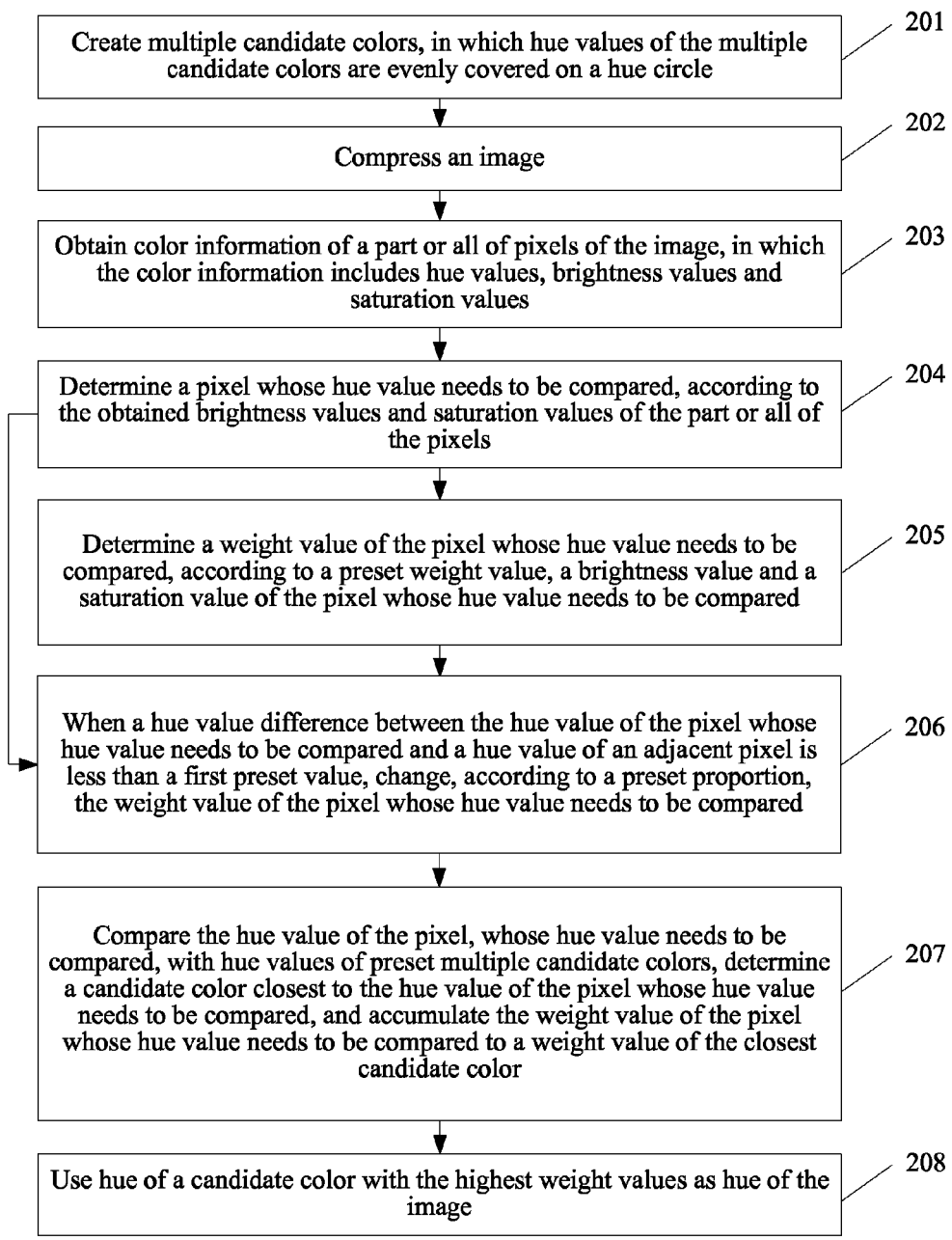
FIG. 2 is a flow chart of a method for determining image hue according to Embodiment 2 of the present invention.

Referring to FIG. 2, this embodiment provides a method for determining image hue. The method includes the following.

201: Create multiple candidate colors, in which hue values of the multiple candidate colors are evenly covered on a hue circle.

Preferably, the number of the multiple candidate colors is 6 to 12, for example, may be 6, 7, 8, 9, 10, 11 or 12. For example, when the number of the candidate colors is 6, the candidate colors may be red (the hue value is 0), yellow (the hue value is 60), green (the hue value is 120), cyan (the hue value is 180), blue (the hue value is 240) and purple (the hue value is 300).

It should be noted that, if the candidate colors are in an RGB format, the candidate colors may be converted into an HSV format. A method for conversion between the two formats is the prior art, and the method for conversion between the RGB format and the HSV format is not limited in this embodiment.

It should be noted that, 201 is an optional step, and generally, 201 does not need to be executed each time unless the candidate colors are created for the first time or the type or the number of the candidate colors needs to be updated.

202: An image may be compressed.

Specifically, at least the following two methods can be adopted to compress the image, and the method for compressing the image is not limited in this embodiment. In the first compression method, when an image is large, for example, an image proportion is greater than or equal to a preset proportion, the image may be compressed to a small proportion, for example, 100×100 pixels; and when the image is small, for example, the image proportion is less than the preset proportion, the image may not be compressed. In the second compression method, if the width or height of an image is greater than or equal to a certain preset value, the width and the height both may be divided by 2 at the same time cyclically, till both the width and the height are less than the preset value.

It should be noted that step 202 is optional, and the execution of step 202 can increase the speed of obtaining pixels.

203: Obtain color information of a part or all of pixels of the image, in which the color information includes hue values, brightness values and saturation values.

The obtaining the color information of the part of the pixels of the image includes:

obtaining color information of pixels of the image by line interlaced scanning or dot interlaced scanning The obtaining the color information of all of the pixels of the image includes:

obtaining color information of each pixel of the image.

It should be noted that, if an image is small, for example, an image proportion is less than a preset proportion, color information of all of the pixels of the image may be obtained; and if the image is large, for example, the image proportion is greater than or equal to the preset proportion, in order to increase the speed of obtaining color information of pixels, color information of a part of the pixels of the image may be obtained by performing line interlaced scanning on the pixels or performing dot interlaced scanning on the pixels.

In this embodiment, the color information of the pixel includes a hue value, a saturation value and a brightness value. The numerical range of the hue value is [0, 360], the numerical range of the saturation value is [0, 1], and the numerical range of the brightness value is [0, 1].

204: Determine a pixel whose hue value needs to be compared, according to the obtained brightness values and saturation values of the part or all of the pixels.

Specifically, products of the obtained brightness values and saturation values of the part or all of the pixels are compared with a second preset value, and a pixel with a product of the brightness value and the saturation value not less than the second preset value is determined as the pixel whose hue value needs to be compared.

For example, for a pixel with a product of the brightness value and the saturation value less than 0.1, the pixel is considered to be not vivid, not striking, and not strongly perceived by human eyes, then the pixel is removed, and a pixel with a product not less than 0.1 is determined as the pixel whose hue value needs to be compared.

After step 204, to improve the accuracy of determining the hue, step 205 may be executed, or step 206 may be executed, or step 205 may be executed first and step 206 may be executed subsequently. Besides, step 205 and step 206 are optional steps.

205: Determine a weight value of the pixel whose hue value needs to be compared, according to a preset weight value, a brightness value and a saturation value of the pixel whose hue value needs to be compared.

Specifically, the preset weight value, the brightness value and the saturation value of the pixel whose hue value needs to be compared are multiplied, to obtain the weight value of the pixel whose hue value needs to be compared; or, the product of the preset weight value, the brightness value and the saturation value of the pixel whose hue value needs to be compared is divided by a third preset value, to obtain the weight value of the pixel whose hue value needs to be compared.

It should be noted that, the preset weight values of pixels whose hue values need to be compared may be the same. For example, the preset weight values of the pixels whose hue values need to be compared are all set to 1. The specific value of the preset weight values is not limited in this embodiment.

For example, the product of the brightness value and the saturation value can reflect the degree of perceiving a pixel color by human eyes. The greater the product of the brightness value and the saturation value is, the more obviously the human eyes can perceive the pixel color, the higher the weight of the pixel should be. Therefore, for a pixel with a product of the brightness value and the saturation value greater than or equal to 0.1, the pixel is considered to be effective, human eyes can obviously perceive the color of the pixel, and the weight of the pixel can be increased. The product of the brightness and saturation of the pixel is divided by a preset value, for example, 0.1, then is rounded, and a weight value in [1, 10] is obtained. In this way, if an impact factor of the pixel is high, the weight value is correspondingly high, which conforms to the visual feeling of human eyes.

206: When a hue value difference between the hue value of the pixel whose hue value needs to be compared and a hue value of an adjacent pixel is less than a first preset value, change, according to a preset proportion, the weight value of the pixel whose hue value needs to be compared.

Specifically, when a hue value difference between the hue value of the pixel whose hue value needs to be compared and a hue value of a pixel on the left side is less than the first preset value, increase, according to the preset proportion, the weight value of the pixel whose hue value needs to be compared;

or, when a hue value difference between the hue value of the pixel whose hue value needs to be compared and a hue value of a pixel on the right side is less than the first preset value, increase, according to the preset proportion, the weight value of the pixel whose hue value needs to be compared;

or, when a hue value difference between the hue value of the pixel whose hue value needs to be compared and a hue value of a pixel on the upper side is less than the first preset value, increase, according to the preset proportion, the weight value of the pixel whose hue value needs to be compared;

or, when a hue value difference between the hue value of the pixel whose hue value needs to be compared and a hue value of a pixel on the lower side is less than the first preset value, increase, according to the preset proportion, the weight value of the pixel whose hue value needs to be compared.

For example, if the hue value difference between the pixel whose hue value needs to be compared and the pixel on the left side is less than 27, it is considered that the pixel whose hue value needs to be compared and the pixel on the left side are pixels close in color and are left and right adjacent pixels, and the weight value of the pixel whose hue value needs to be compared is multiplied by 1.1; and if the hue value difference between the pixel whose hue value needs to be compared and the pixel on the upper side is less than 27, it is considered that the pixel whose hue value needs to be compared and the pixel on the upper side are pixels close in color and are upper and lower adjacent pixels, and the weight value of the pixel whose hue value needs to be compared is multiplied by 1.1. In this way, the weight value of the pixel with large area of color can be increased. The specific proportion for increasing the weight value is not limited in this embodiment.

207: Compare the hue value of the pixel, whose hue value needs to be compared, with hue values of preset multiple candidate colors, determine a candidate color closest to the hue value of the pixel whose hue value needs to be compared, and accumulate the weight value of the pixel whose hue value needs to be compared to a weight value of the closest candidate color.

It should be noted that, the preset weight values of the multiple candidate colors are the same, for example, may be set to 0.

208: Use hue of a candidate color with the highest weight value as hue of the image.

It should be noted that an execution subject of steps 201 to 208 is a wireless handheld device.

Besides, it should be understood that, the first preset value and the second preset value involved in the embodiment of the present invention are merely for differentiation and do not imply the sequence or which one is larger.

In this embodiment, color information of a part or all of pixels of an image is obtained, a pixel whose hue value needs to be compared is determined according to obtained brightness values and saturation values of the part or all of the pixels, the hue value of the pixel whose hue value needs to be compared is compared with hue values of preset multiple candidate colors with hue values evenly covered on a hue circle, a closest candidate color is determined, a weight value of the pixel whose hue value needs to be compared is accumulated to a weight value of the closest candidate color, and the hue of a candidate color with the highest weight value is used as the hue of the image. Therefore, the overall hue value of the image is calculated rapidly and accurately, and the visual feeling of human eyes is truly reflected.

Embodiment 3

Figure 3:
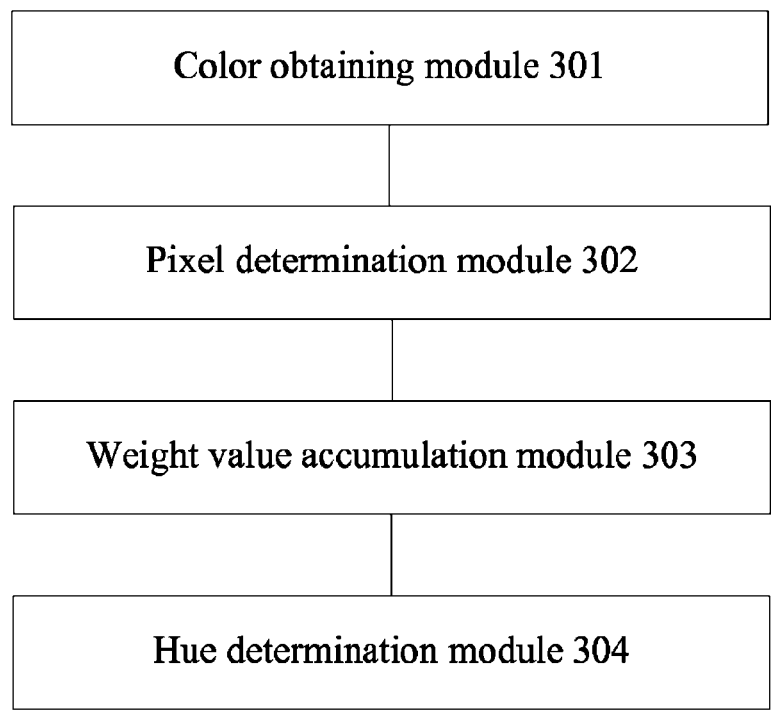
FIG. 3 is a schematic structural diagram of a wireless handheld device for determining image hue according to Embodiment 3 of the present invention.
Figure 4:
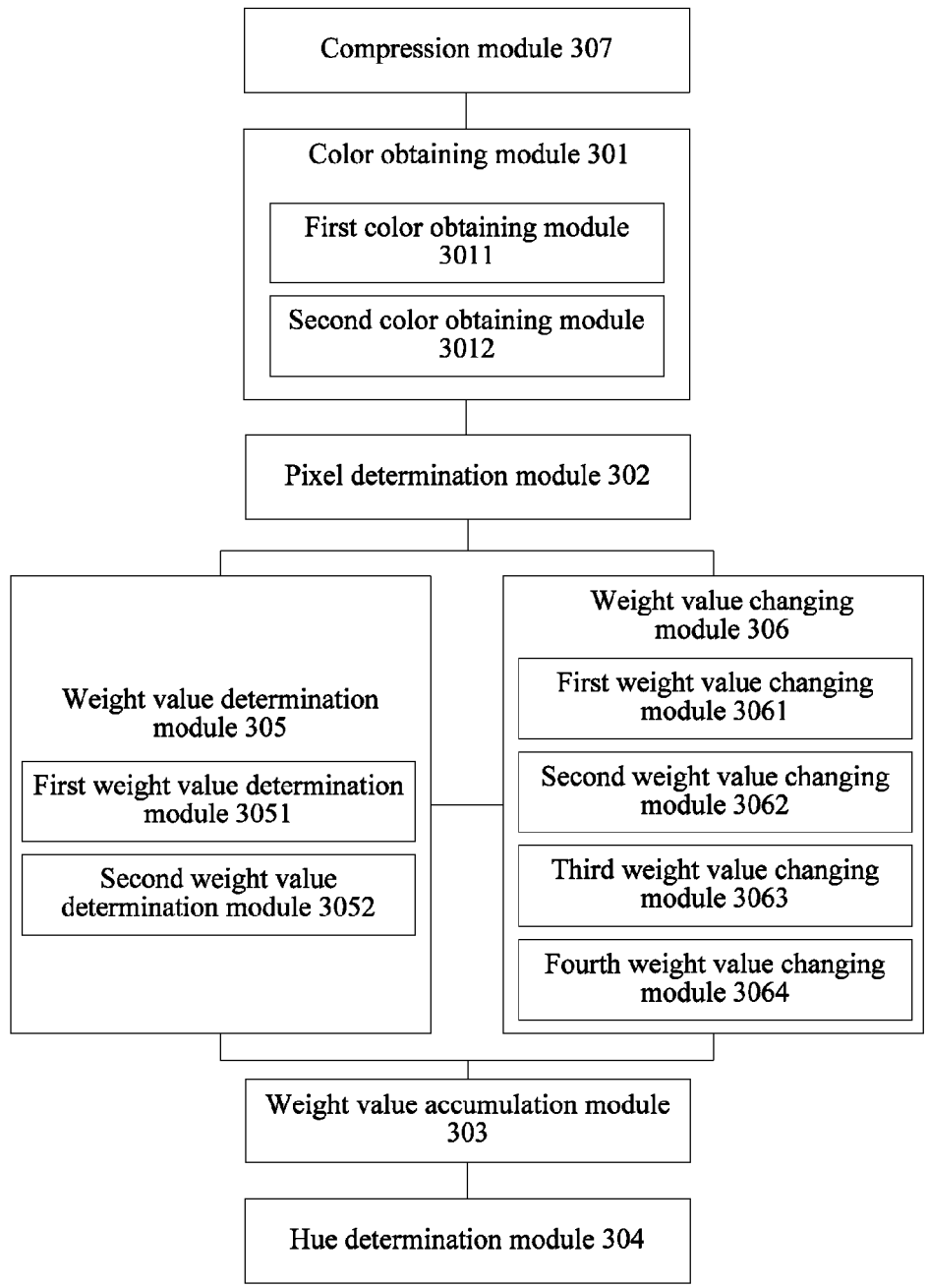
FIG. 4 is another schematic structural diagram of a wireless handheld device for determining image hue according to Embodiment 3 of the present invention.

Referring to FIG. 3, this embodiment provides a wireless handheld device for determining image hue. The wireless handheld device includes:

a color obtaining module 301, configured to obtain color information of a part or all of pixels of an image, in which the color information includes hue values, brightness values and saturation values;

a pixel determination module 302, configured to determine a pixel whose hue value needs to be compared, according to the obtained brightness values and saturation values of the part or all of the pixels;

a weight value accumulation module 303, configured to compare the hue value of the pixel, whose hue value needs to be compared, with hue values of preset multiple candidate colors, determine a candidate color closest to the hue value of the pixel whose hue value needs to be compared, and accumulate a weight value of the pixel whose hue value needs to be compared to a weight value of the closest candidate color, in which the hue values of the multiple candidate colors are evenly covered on a hue circle; and a hue determination module 304, configured to use hue of a candidate color with the highest weight value as hue of the image.

Furthermore, the wireless handheld device further includes:

a weight value determination module 305, configured to, before the hue value of the pixel whose hue value needs to be compared is compared with the hue values of the preset multiple candidate colors, determine the weight value of the pixel whose hue value needs to be compared, according to a preset weight value, a brightness value and a saturation value of the pixel whose hue value needs to be compared.

Furthermore, the wireless handheld device further includes:

a weight value changing module 306, configured to, before the hue value of the pixel whose hue value needs to be compared is compared with the hue values of the preset multiple candidate colors, when a hue value difference between the hue value of the pixel whose hue value needs to be compared and a hue value of an adjacent pixel is less than a first preset value, change, according to a preset proportion, the weight value of the pixel whose hue value needs to be compared.

The weight value changing module 306 includes at least one of the following modules:

a first weight value changing module 3061, configured to, when a hue value difference between the hue value of the pixel whose hue value needs to be compared and a hue value of a pixel on the left side is less than the first preset value, increase, according to the preset proportion, the weight value of the pixel whose hue value needs to be compared;

a second weight value changing module 3062, configured to, when a hue value difference between the hue value of the pixel whose hue value needs to be compared and a hue value of a pixel on the right side is less than the first preset value, increase, according to the preset proportion, the weight value of the pixel whose hue value needs to be compared;

a third weight value changing module 3063, configured to, when a hue value difference between the hue value of the pixel whose hue value needs to be compared and a hue value of a pixel on the upper side is less than the first preset value, increase, according to the preset proportion, the weight value of the pixel whose hue value needs to be compared; and a fourth weight value changing module 3064, configured to, when a hue value difference between the hue value of the pixel whose hue value needs to be compared and a hue value of a pixel on the lower side is less than the first preset value, increase, according to the preset proportion, the weight value of the pixel whose hue value needs to be compared.

Furthermore, the pixel determination module 302 is specifically configured to compare products of the obtained brightness values and saturation values of the part or all of the pixels with a second preset value, and determine a pixel with a product of the brightness value and the saturation value not less than the second preset value as the pixel whose hue value needs to be compared.

The weight value determination module 305 includes at least one of the following modules:

a first weight value determination module 3051, configured to multiply the preset weight value, the brightness value and the saturation value of the pixel whose hue value needs to be compared, to obtain the weight value of the pixel whose hue value needs to be compared;

a second weight value determination module 3052, configured to divide a product of the preset weight value, the brightness value and the saturation value of the pixel, whose hue value needs to be compared, by a third preset value, to obtain the weight value of the pixel whose hue value needs to be compared.

Furthermore, the wireless handheld device further includes: a compression module 307, configured to compress the image before the color information of the part or all of the pixels of the image is obtained.

The number of the multiple candidate colors is 6 to 12.

Furthermore, the color obtaining module 301 at least includes at least one of the following modules:

a first color obtaining module 3011, configured to obtain color information of pixels of the image by line interlaced scanning or dot interlaced scanning, in which the color information includes hue values, brightness values and saturation values;

a second color obtaining module 3012, configured to obtain color information of each pixel of the image, in which the color information includes a hue value, a brightness value and a saturation value.

The wireless handheld device provided in this embodiment belongs to the same concept as that of the method embodiments. It can be clearly understood by persons skilled in the art that, for the purpose of convenient and brief description, for the detailed working process of the described wireless handheld device and modules, reference may be made to the corresponding processes in the method embodiments, and details will not be described herein again.

In this embodiment, color information of a part or all of pixels of an image is obtained, a pixel whose hue value needs to be compared is determined according to obtained brightness values and saturation values of the part or all of the pixels, the hue value of the pixel whose hue value needs to be compared is compared with hue values of preset multiple candidate colors with hue values evenly covered on a hue circle, a closest candidate color is determined, a weight value of the pixel whose hue value needs to be compared is accumulated to a weight value of the closest candidate color, and the hue of a candidate color with the highest weight value is used as the hue of the image. Therefore, the overall hue value of the image is calculated rapidly and accurately, and the visual feeling of human eyes is truly reflected.

Persons of ordinary skill in the art may be aware that the exemplary elements or units and method steps described in conjunction with the embodiments disclosed herein can be implemented by electronic hardware or a combination of computer software and electronic hardware. Whether the functions are executed by hardware or the combination of hardware and software depends on specific applications and design constrain conditions of the technical solutions. Persons skilled in the art may use different methods to implement the described functions for each specific application. However, such implementation should not be considered as beyond the scope of the present invention.

It can be clearly understood by persons skilled in the art that, for the purpose of convenient and brief description, for the detailed working process of the described system, device and elements or units, reference may be made to the corresponding processes in the method embodiments, and details will not be described herein again.

In the embodiments provided in the present application, it should be understood that the disclosed device and method may be implemented in other manners. For example, the described device embodiments are merely exemplary. For example, the element division is merely logical function division and can be other division in actual implementation. For example, multiple elements or components may be combined or integrated into another system, or some features may be ignored or not executed. In addition, the displayed or discussed mutual couplings or direct couplings or communication connections may be implemented through some interfaces. The indirect couplings or communication connections between the devices or elements may be implemented in electronic, mechanical or other forms.

In addition, function elements in each embodiment of the present invention may be integrated into a processing element, or each of the elements may exist alone physically, or two or more elements may be integrated into one element.

The above description is merely about specific embodiments of the present invention, but not intended to limit the protection scope of the present invention. Any modifications, variations or replacements that can be easily derived by persons skilled in the art without departing from the technical scope disclosed in the present invention shall fall within the protection scope of the present invention. Therefore, the protection scope of the present invention is subject to the appended claims.

What is claimed is:

1. A method for determining image hue, comprising:
   obtaining color information of a part or all of pixels of an image, wherein the color information comprises hue values, brightness values and saturation values;
   selecting a pixel from the part or all of pixels according to the obtained brightness values and saturation values of the part or all of the pixels;
   obtaining a weight of the selected pixel;
   comparing the obtained hue value of the selected pixel with hue values of preset multiple candidate colors, wherein the hue values of the preset multiple candidate colors are evenly covered on a hue circle and each of the preset multiple candidate colors has an initial weight;
   selecting a first candidate color from the preset multiple candidate colors, wherein the hue value of the first candidate color is closest to the obtained hue value of the selected pixel;
   obtaining an updated weight of the first candidate color by accumulating the weight of the selected pixel to the initial weight of the first candidate color;
   selecting, from the preset multiple candidate colors, a second candidate color having a highest weight according to the updated weight of the first candidate color and the initial weights of the preset multiple candidate colors except the first candidate color; and
   using a hue value of the second candidate color as the image hue.

2. The method according to claim 1, wherein the obtaining the weight of the selected pixel comprises:
   determining the weight of the selected pixel, according to a preset weight value, a brightness value and a saturation value of the selected pixel.

3. The method according to claim 1, wherein the obtaining the weight of the selected pixel comprises:
   when a hue value difference between the hue value of the selected pixel and a hue value of an adjacent pixel is less than a first preset value, obtaining the weight of the selected pixel by changing a preset weight of the selected pixel according to a preset proportion.

4. The method according to claim 3, wherein when the hue value difference between the hue value of the selected pixel and the hue value of the adjacent pixel is less than the preset value, the obtaining the weight of the selected pixel by changing the preset weight value of the pixel according to the preset proportion comprises at least one of the group consisting of:
   (a) when a hue value difference between the hue value of the selected pixel and a hue value of a pixel on the left side is less than the first preset value, increasing the weight value of the selected pixel according to the preset proportion;
   (b) when a hue value difference between the hue value of the selected pixel and a hue value of a pixel on the right side is less than the first preset value, increasing the weight value of the selected pixel according to the preset proportion;
   (c) when a hue value difference between the hue value of the selected pixel and a hue value of a pixel on the upper side is less than the first preset value, increasing the weight value of the selected pixel according to the preset proportion;
   and
   (d) when a hue value difference between the hue value of the selected pixel and a hue value of a pixel on the lower side is less than the first preset value, increasing the weight value of the selected pixel according to the preset proportion.

5. The method according to claim 4, wherein the selecting the pixel from the part or all of pixels according to the obtained brightness values and saturation values of the part or all of the pixels comprises:
   comparing products of the obtained brightness values and saturation values of the part or all of the pixels with a second preset value, and selecting a pixel with a product of the brightness value and the saturation value not less than the second preset value.

6. The method according to claim 2, wherein the determining the weight value of the selected pixel according to the preset weight value, the brightness value and the saturation value of the selected pixel comprises one of the group consisting of:
(a) multiplying the preset weight value, the brightness value and the saturation value of the selected pixel, to obtain the weight value of the selected pixel; and
(b) dividing a product of the preset weight value, the brightness value and the saturation value of the selected pixel, by a third preset value, to obtain the weight value of the selected pixel.

7. A wireless handheld device for determining image hue, comprising:
a color obtaining module, configured to obtain color information of a part or all of pixels of an image, wherein the color information comprises hue values, brightness values and saturation values;
a pixel selecting module, configured to selecting a pixel from the part or all of pixels of the image according to the obtained brightness values and saturation values of the part or all of the pixels;
a weight value obtaining module, configured to obtain a weight of the selected pixel;
a weight value accumulation module, configured to:
compare the obtained hue value of the selected pixel with hue values of preset multiple candidate colors, wherein the hue values of the preset multiple candidate colors are evenly covered on a hue circle and each of the preset multiple candidate colors has an initial weight;
selecting a first candidate color from the preset multiple candidate colors, wherein the hue value of the first candidate color is closest to the obtained hue value of the selected pixel, and
obtain an updated weight of the first candidate color by accumulating the weight value of the selected pixel to the initial weight value of the first candidate color; and
a hue determination module, configured to:
select, from the preset multiple candidate colors, a second candidate color having the highest weight according to the updated weight of the first candidate color and the initial weights of the preset multiple candidate colors except the first candidate color;
use a hue value of the second candidate color with the highest weight value as the image hue.

8. The wireless handheld device according to claim 7, the weight value obtaining module is configured to obtain the weight of the selected pixel
according to a preset weight value, a brightness value and a saturation value of the pixel whose hue value needs to be compared.

9. The wireless handheld device according to claim 8, the weight value obtaining module is configured to obtain the weight of the selected pixel by changing a preset weight of the pixel according to a preset proportion when a hue value difference between the hue value of the selected pixel and a hue value of an adjacent pixel is less than a first preset value.

10. The wireless handheld device according to claim 9, wherein the weight value obtaining module comprises at least one of the following modules:
a first weight value changing module, configured to, when a hue value difference between the hue value of the selected pixel and a hue value of a pixel on the left side is less than the first preset value, increase the weight value of the selected pixel according to the preset proportion;
a second weight value changing module, configured to, when a hue value difference between the hue value of the selected pixel and a hue value of a pixel on the right side is less than the first preset value, increase the weight value of the selected pixel according to the preset proportion;
a third weight value changing module, configured to, when a hue value difference between the hue value of the selected pixel and a hue value of a pixel on the upper side is less than the first preset value, increase the weight value of the selected pixel according to the preset proportion; and
a fourth weight value changing module, configured to, when a hue value difference between the hue value of the selected pixel and a hue value of a pixel on the lower side is less than the first preset value, increase the weight value of the selected pixel according to the preset proportion.

11. The wireless handheld device according to claim 10, wherein the pixel selecting module is configured to:
compare products of the obtained brightness values and saturation values of the part or all of the pixels with a second preset value, and select a pixel with a product of the brightness value and the saturation value not less than the second preset value.

12. The wireless handheld device according to claim 7, wherein the weight value obtaining module comprises at least one of the following modules:
a first weight value determination module, configured to multiply the preset weight value, the brightness value and the saturation value of the selected pixel, to obtain the weight value of the selected pixel; and
a second weight value determination module, configured to divide a product of the preset weight value, the brightness value and the saturation value of the selected pixel by a third preset value, to obtain the weight value of the selected pixel.

13. A wireless handheld device for determining image hue, comprising a processor and a memory storing instructions, when executing the instructions, the processor is configured to:
obtain color information of a part or all of pixels of an image, wherein the color information comprises hue values, brightness values and saturation values;
select a pixel from the part or all of pixels of the image according to the obtained brightness values and saturation values of the part or all of the pixels;
obtain a weight of the selected pixel;
compare the obtained hue value of the selected pixel with hue values of preset multiple candidate colors, wherein the hue values of the preset multiple candidate colors are evenly covered on a hue circle and each of the preset multiple candidate colors has an initial weight;
select a first candidate color from the preset multiple candidate colors, wherein the hue value of the first candidate color is closest to the obtained hue values of the selected pixel;
obtain an updated weight of the first candidate color by accumulating the-weight of the select pixel to the initial weight of the first candidate color;
select, from the preset multiple candidate colors, a second candidate color having a highest weight according to the updated weight of the first candidate color and the initial weights of the preset multiple candidate colors except the first candidate color; and
use a hue value of the second candidate color as the image hue.

14. The wireless handheld device according to claim 13, the processor is configured to:
   obtain a weight of the selected pixel according to a preset weight value, a brightness value and a saturation value of the selected pixel.

* * * * *